(12) United States Patent
Matheja et al.

(10) Patent No.: US 10,332,545 B2
(45) Date of Patent: Jun. 25, 2019

(54) SYSTEM AND METHOD FOR TEMPORAL AND POWER BASED ZONE DETECTION IN SPEAKER DEPENDENT MICROPHONE ENVIRONMENTS

(71) Applicant: Nuance Communications, Inc., Burlington, MA (US)

(72) Inventors: Timo Matheja, Neu-Ulm (DE); Markus Buck, Biberach (DE); Simon Graf, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/823,874

(22) Filed: Nov. 28, 2017

(65) Prior Publication Data

US 2019/0164568 A1     May 30, 2019

(51) Int. Cl.
| | |
|---|---|
| *H04R 1/40* | (2006.01) |
| *G10L 15/22* | (2006.01) |
| *G10L 25/21* | (2013.01) |
| *G10L 25/78* | (2013.01) |
| *G10L 25/84* | (2013.01) |
| *G10L 21/0216* | (2013.01) |

(52) U.S. Cl.
CPC ............. *G10L 25/84* (2013.01); *G10L 15/22* (2013.01); *G10L 25/21* (2013.01); *G10L 25/78* (2013.01); *H04R 1/406* (2013.01); *G10L 2021/02165* (2013.01); *G10L 2021/02166* (2013.01); *G10L 2025/783* (2013.01); *G10L 2025/786* (2013.01); *H04R 2227/005* (2013.01)

(58) Field of Classification Search
CPC . G10L 2021/02165; G10L 2021/02166; G10L 2025/783; G10L 2025/786; G10L 25/78
See application file for complete search history.

(56) References Cited

U.S. PATENT DOCUMENTS

| | | | | |
|---|---|---|---|---|
| 4,752,958 A | * | 6/1988 | Cavazza | G10L 17/00 704/246 |
| 5,963,901 A | * | 10/1999 | Vahatalo | G10L 21/0208 704/218 |
| 6,130,949 A | * | 10/2000 | Aoki | G10H 3/125 381/94.3 |
| 9,293,151 B2 | | 3/2016 | Herbig et al. | |

(Continued)

OTHER PUBLICATIONS

Zohourian et al., "Binaural Speaker Localization and Separation Based on a Joint ITD/ILD Model and Head Movement Tracking", IEEE (ICASSP), (2016), pp. 430-434.

*Primary Examiner* — Eric Yen
(74) *Attorney, Agent, or Firm* — Brian J. Colandreo; Michael T. Abramson; Holland & Knight LLP

(57) ABSTRACT

A method, computer program product, and computer system for receiving, by a computing device, a speech signal from a speaker via a plurality of microphone zones. A temporal cue based confidence may be determined for at least a portion of the plurality of microphone zones. A power cue based confidence may be determined for at least a portion of the plurality of microphone zones. A microphone zone of the plurality of microphone zones from which to use an output signal of the speaker may be identified based upon, at least in part, a combination of the temporal cue based confidence and the power cue based confidence.

15 Claims, 6 Drawing Sheets

(56) References Cited

U.S. PATENT DOCUMENTS

| | | | |
|---|---|---|---|
| 9,767,826 B2 | 9/2017 | Matheja et al. | |
| 2003/0023430 A1* | 1/2003 | Wang | G10L 19/26 704/226 |
| 2003/0158732 A1* | 8/2003 | Pi | G01S 13/66 704/251 |
| 2003/0185443 A1* | 10/2003 | Jinnai | G06K 9/64 382/181 |
| 2004/0193407 A1* | 9/2004 | Ramabadran | G10L 25/90 704/207 |
| 2008/0077387 A1* | 3/2008 | Ariu | G06F 17/289 704/3 |
| 2009/0228268 A1* | 9/2009 | Kurata | G10L 17/00 704/224 |
| 2010/0081487 A1* | 4/2010 | Chen | G10L 21/0208 455/575.1 |
| 2013/0006634 A1* | 1/2013 | Grokop | G10L 17/10 704/245 |
| 2013/0191117 A1* | 7/2013 | Atti | G10L 25/84 704/226 |
| 2013/0332165 A1* | 12/2013 | Beckley | G10L 17/04 704/246 |
| 2014/0278394 A1* | 9/2014 | Bastyr | G10L 21/0208 704/233 |
| 2015/0081295 A1* | 3/2015 | Yun | G10L 17/005 704/236 |
| 2016/0029111 A1* | 1/2016 | Wacquant | H04R 3/005 381/71.4 |
| 2017/0332168 A1* | 11/2017 | Moghimi | H04R 3/005 |

* cited by examiner

SYSTEM AND METHOD FOR TEMPORAL AND POWER BASED ZONE DETECTION IN SPEAKER DEPENDENT MICROPHONE ENVIRONMENTS

BACKGROUND

Generally, speech continues to gain importance in human-machine interaction. This may apply to multiple aspects of life, including, for example, voice-activated commands or phone conversations in a vehicle. Some vehicles may be equipped with multiple microphones in various locations in the car to allow multiple passengers to take advantage of voice-activated features. For instance, the driver may have a dedicated microphone, the passenger may have a dedicated microphone, etc. In this non-limiting example, it may be beneficial to determine which passenger is speaking, which may be difficult given the acoustic environment, close proximity of passengers, etc. However, current processes of Speaker Activity Detection (SAD) in multi-microphone systems may not be as robust, accurate, or as efficient as needed to satisfy the expectations of the end users.

BRIEF SUMMARY OF DISCLOSURE

In one example implementation, a method, performed by one or more computing devices, may include but is not limited to receiving, by a computing device, a speech signal from a speaker via a plurality of microphone zones. A temporal cue based confidence may be determined for at least a portion of the plurality of microphone zones. A power cue based confidence may be determined for at least a portion of the plurality of microphone zones. A microphone zone of the plurality of microphone zones from which to use an output signal of the speaker may be identified based upon, at least in part, a combination of the temporal cue based confidence and the power cue based confidence.

One or more of the following example features may be included. Identifying the microphone zone of the plurality of microphone zones from which the speech signal originated from the speaker may include comparing the temporal cue based confidence and the power cue based confidence. Identifying the microphone zone of the plurality of microphone zones from which the speech signal originated from the speaker may further include selecting the temporal cue based confidence to identify the microphone zone when the temporal cue based confidence is higher than the power cue based confidence. Identifying the microphone zone of the plurality of microphone zones from which the speech signal originated from the speaker may further include selecting the power cue based confidence to identify the microphone zone when the power cue based confidence is higher than the temporal cue based confidence. The temporal cue based confidence may be based upon, at least in part, a signal-to-noise ratio. The temporal cue based confidence may be based upon, at least in part, evaluation of a sign of an imaginary part of a delta phase in different frequency sub-bands in a sub-band domain. The temporal cue based confidence may be based upon, at least in part, an observed delay being one of greater than and less than a pre-defined delay.

In another example implementation, a computing system may include one or more processors and one or more memories configured to perform operations that may include but are not limited to receiving a speech signal from a speaker via a plurality of microphone zones. A temporal cue based confidence may be determined for at least a portion of the plurality of microphone zones. A power cue based confidence may be determined for at least a portion of the plurality of microphone zones. A microphone zone of the plurality of microphone zones from which to use an output signal of the speaker may be identified based upon, at least in part, a combination of the temporal cue based confidence and the power cue based confidence.

One or more of the following example features may be included. Identifying the microphone zone of the plurality of microphone zones from which the speech signal originated from the speaker may include comparing the temporal cue based confidence and the power cue based confidence. Identifying the microphone zone of the plurality of microphone zones from which the speech signal originated from the speaker may further include selecting the temporal cue based confidence to identify the microphone zone when the temporal cue based confidence is higher than the power cue based confidence. Identifying the microphone zone of the plurality of microphone zones from which the speech signal originated from the speaker may further include selecting the power cue based confidence to identify the microphone zone when the power cue based confidence is higher than the temporal cue based confidence. The temporal cue based confidence may be based upon, at least in part, a signal-to-noise ratio. The temporal cue based confidence may be based upon, at least in part, evaluation of a sign of an imaginary part of a delta phase in different frequency sub-bands in a sub-band domain. The temporal cue based confidence may be based upon, at least in part, an observed delay being one of greater than and less than a pre-defined delay.

In another example implementation, a computer program product may reside on a computer readable storage medium having a plurality of instructions stored thereon which, when executed across one or more processors, may cause at least a portion of the one or more processors to perform operations that may include but are not limited to receiving a speech signal from a speaker via a plurality of microphone zones. A temporal cue based confidence may be determined for at least a portion of the plurality of microphone zones. A power cue based confidence may be determined for at least a portion of the plurality of microphone zones. A microphone zone of the plurality of microphone zones from which to use an output signal of the speaker may be identified based upon, at least in part, a combination of the temporal cue based confidence and the power cue based confidence.

One or more of the following example features may be included. Identifying the microphone zone of the plurality of microphone zones from which the speech signal originated from the speaker may include comparing the temporal cue based confidence and the power cue based confidence. Identifying the microphone zone of the plurality of microphone zones from which the speech signal originated from the speaker may further include selecting the temporal cue based confidence to identify the microphone zone when the temporal cue based confidence is higher than the power cue based confidence. Identifying the microphone zone of the plurality of microphone zones from which the speech signal originated from the speaker may further include selecting the power cue based confidence to identify the microphone zone when the power cue based confidence is higher than the temporal cue based confidence. The temporal cue based confidence may be based upon, at least in part, a signal-to-noise ratio. The temporal cue based confidence may be based upon, at least in part, evaluation of a sign of an imaginary part of a delta phase in different frequency sub-bands in a sub-band domain. The temporal cue based confidence may be based upon, at least in part, an observed delay being one of greater than and less than a pre-defined delay.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
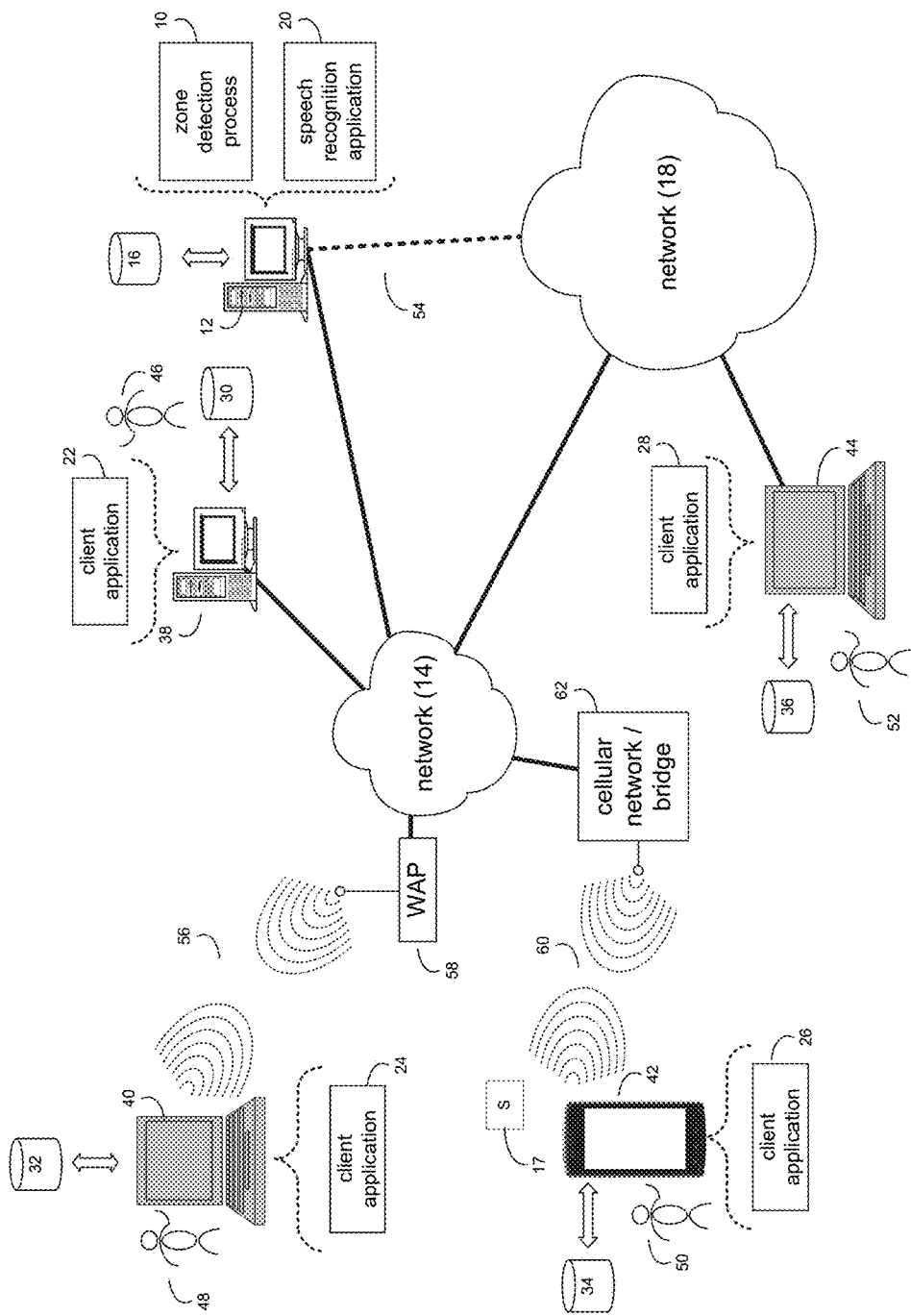
FIG. 1 is an example diagrammatic view of a zone detection process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown zone detection process 10 that may reside on and may be executed by a computer (e.g., computer 12), which may be connected to a network (e.g., network 14) (e.g., the internet or a local area network). Examples of computer 12 (and/or one or more of the client electronic devices noted below and/or any suitable device that includes a microphone, speaker/loudspeaker, etc.) may include, but are not limited to, a storage system (e.g., a Network Attached Storage (NAS) system, a Storage Area Network (SAN)), a personal computer(s), a laptop computer(s), mobile computing device(s), a social network server, a text message server, a photo server, a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a zone detection process, such as zone detection process 10 of FIG. 1, may receive, by a computing device, a speech signal from a speaker via a plurality of microphone zones. A temporal cue based confidence may be determined for at least a portion of the plurality of microphone zones. A power cue based confidence may be determined for at least a portion of the plurality of microphone zones. A microphone zone of the plurality of microphone zones from which to use an output signal of the speaker may be identified based upon, at least in part, a combination of the temporal cue based confidence and the power cue based confidence.

In some implementations, the instruction sets and subroutines of zone detection process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility", as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, zone detection process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a speech recognition application (e.g., speech recognition application 20), examples of which may include, but are not limited to, e.g., an automatic speech recognition (ASR) application (e.g., modeling, etc.), a natural language understanding (NLU) application (e.g., machine learning, intent discovery, etc.), a text to speech (TTS) application (e.g., context awareness, learning, etc.), a speech signal enhancement (SSE) application (e.g., multi-zone processing/beamforming, noise suppression, etc.), a voice biometrics/wake-up-word processing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration and/or recognition/translation of spoken language into text and other types of computing devices that are controllable or otherwise operable based on natural language input received by computing devices. In some implementations, zone detection process 10 and/or speech recognition application 20 may be accessed via one or more of client applications 22, 24, 26, 28. In some implementations, zone detection process 10 may be a standalone application, or may be an applet/application/script/extension that may interact with and/or be executed within speech recognition application 20, a component of speech recognition application 20, and/or one or more of client applications 22, 24, 26, 28. In some implementations, speech recognition application 20 may be a standalone application, or may be an applet/application/script/extension that may interact with and/or be executed within zone detection process 10, a component of zone detection process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of zone detection process 10 and/or speech recognition application 20. Examples of client applications 22, 24, 26, 28 may include, but are not limited to, e.g., an automatic speech recognition (ASR) application, a natural language understanding (NLU) application, a text to speech (TTS) application, a speech signal enhancement (SSE) application, a voice biometrics/wake-up-word processing application, a video conferencing application, a voice-over-IP application, a video-over-IP application, an Instant Messaging (IM)/"chat" application, a short messaging service (SMS)/multimedia messaging service (MMS) application, or other application that allows for virtual meeting and/or remote collaboration and/or recognition/translation of spoken language into text and other types of computing devices that are controllable or otherwise operable based on natural language input received by computing devices, a standard and/or mobile web browser, an email application (e.g., an email client application), a textual and/or graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a remote control, an audio system, a smart television, a media (e.g., video, photo, etc.) capturing device, a dedicated network device, or combination thereof. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of zone detection process 10 (and vice versa). Accordingly, in some implementations, zone detection process 10 may be a purely server-side application, a purely client-side application, or a hybrid server-side/client-side application that is cooperatively executed by one or more of client applications 22, 24, 26, 28 and/or zone detection process 10.

In some implementations, one or more of client applications 22, 24, 26, 28 may be configured to effectuate some or all of the functionality of speech recognition application 20 (and vice versa). Accordingly, in some implementations, speech recognition application 20 may be a purely server-side application, a purely client-side application, or a hybrid server-side/client-side application that is cooperatively executed by one or more of client applications 22, 24, 26, 28 and/or speech recognition application 20. As one or more of client applications 22, 24, 26, 28, zone detection process 10, and speech recognition application 20, taken singly or in any combination, may effectuate some or all of the same functionality, any description of effectuating such functionality via one or more of client applications 22, 24, 26, 28, zone detection process 10, speech recognition application 20, or combination thereof, and any described interaction(s) between one or more of client applications 22, 24, 26, 28, zone detection process 10, speech recognition application 20, or combination thereof to effectuate such functionality, should be taken as an example only and not to limit the scope of the disclosure.

In some implementations, one or more of users 46, 48, 50, 52 may access computer 12 and zone detection process 10

(e.g., using one or more of client electronic devices 38, 40, 42, 44) directly through network 14 or through secondary network 18. Further, computer 12 may be connected to network 14 through secondary network 18, as illustrated with phantom link line 54. Zone detection process 10 may include one or more user interfaces, such as browsers and textual or graphical user interfaces, through which users 46, 48, 50, 52 may access zone detection process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
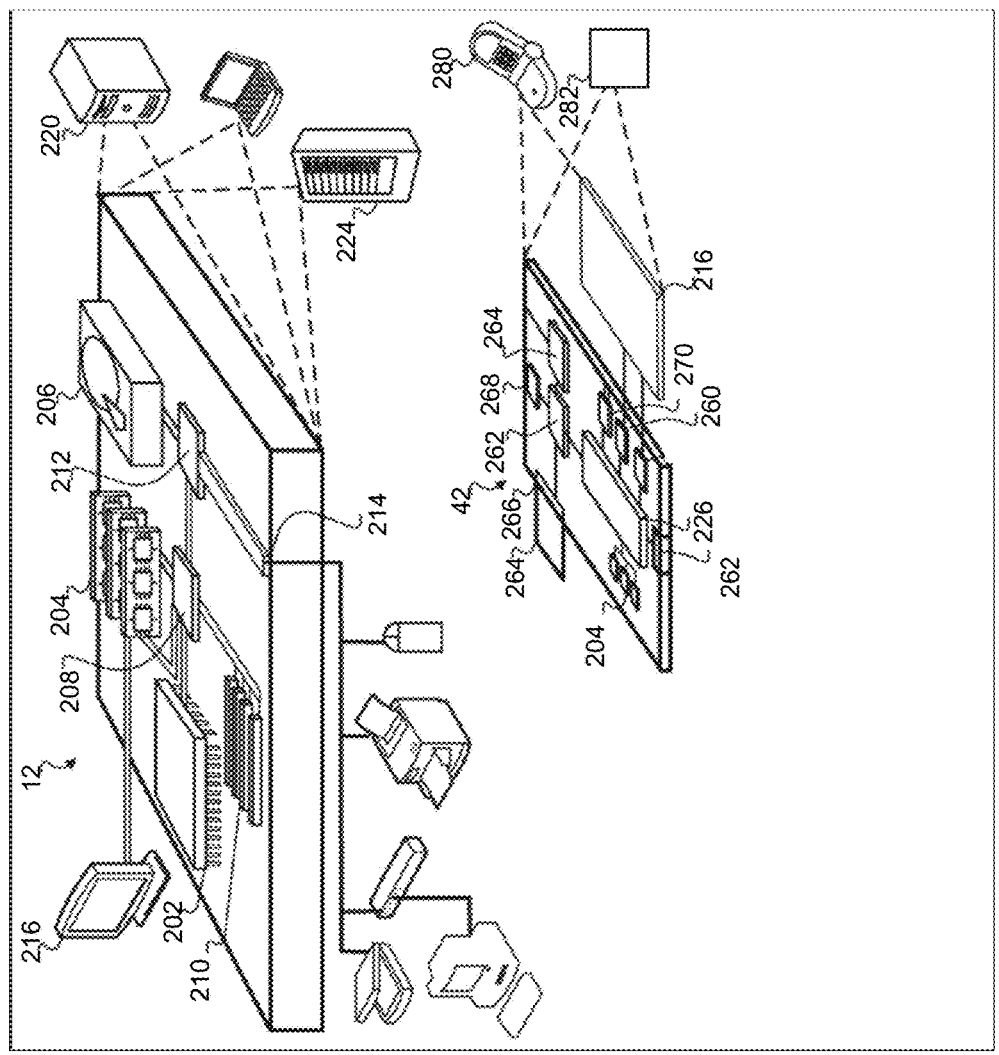
FIG. 2 is an example diagrammatic view of a computer and client electronic device of FIG. 1 according to one or more example implementations of the disclosure.
Figure 3:
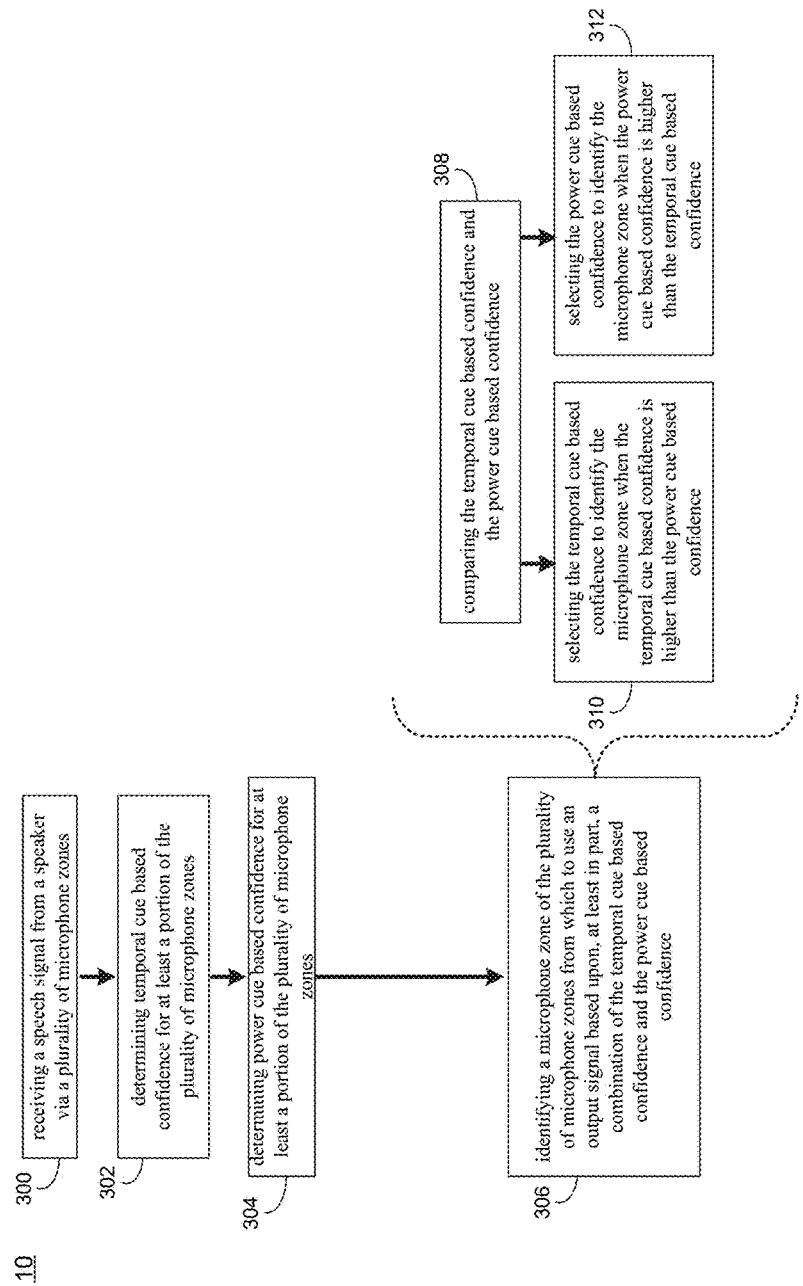
FIG. 3 is an example flowchart of a zone detection process according to one or more example implementations of the disclosure.
Figure 4:
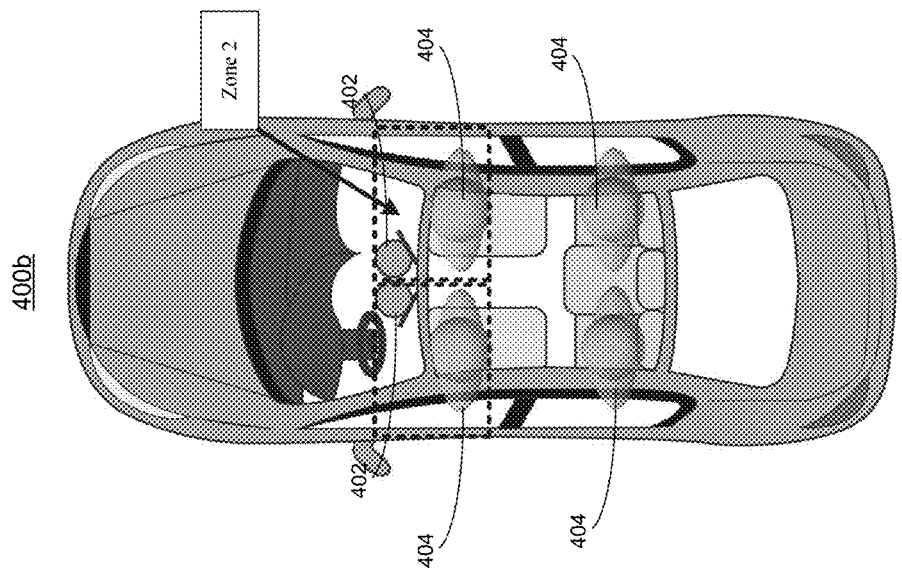
FIG. 4 is an example diagrammatic view of example vehicles that may be used according to one or more example implementations of the disclosure.
Figure 4:
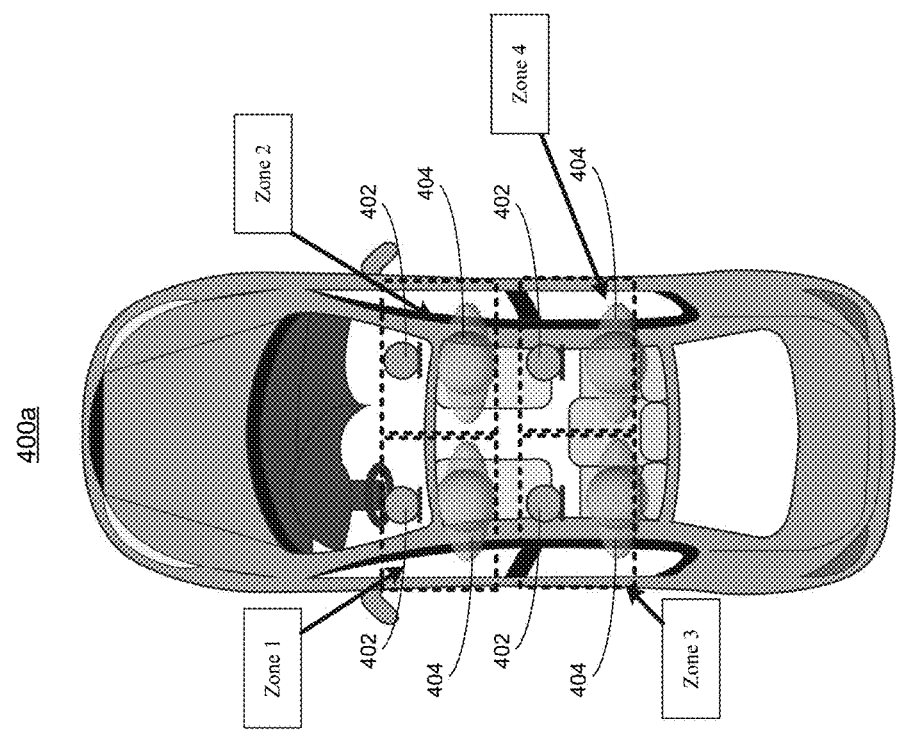

Referring also to the example implementation of FIG. 2, there is shown a diagrammatic view of computer 12 and client electronic device 42. While client electronic device 42 and computer 12 are shown in this figure, this is for example purposes only and is not intended to be a limitation of this disclosure, as other configurations are possible. Additionally, any computing device capable of executing, in whole or in part, zone detection process 10 may be substituted for client electronic device 42 and computer 12 (in whole or in part) within FIG. 2, examples of which may include but are not limited to one or more of client electronic devices 38, 40, and 44. Client electronic device 42 and/or computer 12 may also include other devices, such as televisions with one or more processors embedded therein or attached thereto as well as any of the microphones, microphone arrays, and/or speakers described herein. The components shown here, their connections and relationships, and their functions, are meant to be examples only, and are not meant to limit implementations of the disclosure described.

In some implementations, computer 12 may include processor 202, memory 204, storage device 206, a high-speed interface 208 connecting to memory 204 and high-speed expansion ports 210, and low speed interface 212 connecting to low speed bus 214 and storage device 206. Each of the components 202, 204, 206, 208, 210, and 212, may be interconnected using various busses, and may be mounted on a common motherboard or in other manners as appropriate. The processor 202 can process instructions for execution within the computer 12, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

Memory 204 may store information within the computer 12. In one implementation, memory 204 may be a volatile memory unit or units. In another implementation, memory 204 may be a non-volatile memory unit or units. The memory 204 may also be another form of computer-readable medium, such as a magnetic or optical disk.

Storage device 206 may be capable of providing mass storage for computer 12. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

High speed controller 208 may manage bandwidth-intensive operations for computer 12, while the low speed controller 212 may manage lower bandwidth-intensive operations. Such allocation of functions is exemplary only. In one implementation, the high-speed controller 208 may be coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computer 12 may be implemented in a number of different forms, as shown in the figure. For example, computer 12 may be implemented as a standard server 220, or multiple times in a group of such servers. It may also be implemented as part of a rack server system 224. Alternatively, components from computer 12 may be combined with other components in a mobile device (not shown), such as client electronic device 42. Each of such devices may contain one or more of computer 12, client electronic device 42, and an entire system may be made up of multiple computing devices communicating with each other.

Client electronic device 42 may include processor 226, memory 204, an input/output device such as display 216, a communication interface 262, and a transceiver 264, among other components. Client electronic device 42 may also be provided with a storage device, such as a microdrive or other device, to provide additional storage. Each of the components 226, 204, 216, 262, and 264, may be interconnected using various buses, and several of the components may be mounted on a common motherboard or in other manners as appropriate.

Processor 226 may execute instructions within client electronic device 42, including instructions stored in the memory 204. The processor may be implemented as a chipset of chips that include separate and multiple analog and digital processors. The processor may provide, for example, for coordination of the other components of client electronic device 42, such as control of user interfaces, applications run by client electronic device 42, and wireless communication by client electronic device 42.

In some embodiments, processor 226 may communicate with a user through control interface 258 and display interface 260 coupled to a display 216. The display 216 may be, for example, a TFT LCD (Thin-Film-Transistor Liquid Crystal Display) or an OLED (Organic Light Emitting Diode) display, or other appropriate display technology. The display interface 260 may comprise appropriate circuitry for driving the display 216 to present graphical and other information to a user. The control interface 258 may receive commands from a user and convert them for submission to the processor 226. In addition, an external interface 262 may be provide in communication with processor 226, so as to enable near area communication of client electronic device 42 with other devices. External interface 262 may provide, for example, for wired communication in some implementations, or for wireless communication in other implementations, and multiple interfaces may also be used.

In some embodiments, memory 204 may store information within the Client electronic device 42. The memory 204 can be implemented as one or more of a computer-readable medium or media, a volatile memory unit or units, or a non-volatile memory unit or units. Expansion memory 264 may also be provided and connected to client electronic device 42 through expansion interface 266, which may include, for example, a SIMM (Single In Line Memory Module) card interface. Such expansion memory 264 may provide extra storage space for client electronic device 42, or may also store applications or other information for client electronic device 42. Specifically, expansion memory 264 may include instructions to carry out or supplement the processes described above, and may include secure information also. Thus, for example, expansion memory 264 may be provide as a security module for client electronic device 42, and may be programmed with instructions that permit secure use of client electronic device 42. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 204, expansion memory 264, memory on processor 226, or a propagated signal that may be received, for example, over transceiver 264 or external interface 262.

Client electronic device 42 may communicate wirelessly through communication interface 262, which may include digital signal processing circuitry where necessary. Communication interface 262 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 264. In addition, short-range communication may occur, such as using a Bluetooth, WiFi, or other such transceiver (not shown). In addition, GPS (Global Positioning System) receiver module 268 may provide additional navigation and location-related wireless data to client electronic device 42, which may be used as appropriate by applications running on client electronic device 42.

Client electronic device 42 may also communicate audibly using audio codec 270, which may receive spoken information from a user and convert it to usable digital information. Audio codec 270 may likewise generate audible sound for a user, such as through a speaker, e.g., in a handset of client electronic device 42. Such sound may include sound from voice telephone calls, may include recorded sound (e.g., voice messages, music files, etc.) and may also include sound generated by applications operating on client electronic device 42.

Client electronic device 42 may be implemented in a number of different forms, as shown in the figure. For example, it may be implemented as a cellular telephone 280. It may also be implemented as part of a smartphone 282, personal digital assistant, remote control, vehicular sound, navigation, or phone system, or other similar mobile device.

As will be discussed below, zone detection (ZD) process 10 may at least help, e.g., improve speech recognition technology, necessarily rooted in computer technology in order to overcome an example and non-limiting problem specifically arising in the realm of speech recognition processes, thereby improve existing technological processes associated with, e.g., multi-microphone systems and/or multi-person speech systems.

The Zone Detection Process:

As discussed above and referring also at least to the example implementations of FIGS. 3-6, zone detection (ZD) process 10 may receive 300, by a computing device, a speech signal from a speaker via a plurality of microphone zones. ZD process 10 may determine 302 a temporal cue based confidence for at least a portion of the plurality of microphone zones. ZD process 10 may determine 304 a power cue based confidence for at least a portion of the plurality of microphone zones. ZD process 10 may identify 306 a microphone zone of the plurality of microphone zones from which to use an output signal of the speaker based upon, at least in part, a combination of the temporal cue based confidence and the power cue based confidence.

As will be discussed below, the present disclosure may relate to a multi-microphone system that may be used to capture the speech sound from multiple persons (speakers). Referring at least to the example implementation of FIG. 4, example vehicles 400a and 400b are shown. In the example vehicles 400a and 400b, there are shown microphones 402, with multiple possible passengers 404. Generally, the microphones are arranged such that different spatial microphone zones (e.g., zone 1, zone 2 . . . zone Z) are covered by the microphones. That is, the microphones may be spatially separated such that a spatial "zone" may be defined by the proximity to the corresponding microphone ("acoustic bubble" around the microphone). When the microphones are directional microphones (e.g., cardioid microphones), the focus on a spatial microphone zone may be emphasized.

It will be appreciated that various other vehicles (both land, air and sea vehicles) and microphone locations may be used without departing from the scope of the disclosure. Additionally, while the present disclosure may be described for applications in a vehicle (e.g., temperature system control, sound system control, navigation system control, phone system control, etc.), other applications may be similarly used (e.g., conference systems in a conference room with one microphone for each participant). As such, the use of a vehicle should be taken as example only and not to otherwise limit the scope of the disclosure.

In some implementations, zone detection process (ZD) 10 may receive 300, by a computing device, a speech signal from a speaker via a plurality of microphone zones. For example, based on the multiple microphone signals (e.g., speech signals) being received 300, it may be beneficial to detect from which seat (e.g., from which spatial microphone zone) a passenger/person is speaking. For instance, by identifying the zone from which a passenger is speaking, ZD process 10 may, e.g., be used for purpose of signal mixing. For example, depending on speech activity, the active microphone channel may be selected by the mixer (via ZD process 10), which may be helpful for telephone calls in conference mode in a car or conference room. ZD process 10 may further be used for meeting transcription. For example, ZD process 10 may detect and document who spoke at which times during a meeting or a conversation. At the same time, the audio signal may be recorded and/or transcribed by a speech recognition system of ZD process 10, where the content of a meeting may be annotated (via ZD 10). As another example, ZD process 10 may be used as speech control in the car (or otherwise) where ZD process 10 may need to be aware of which passenger is interacting with the system. For example, if the back-seat passenger on the left side says: "increase temperature by 2 degrees," ZD process 10 may know to instruct the HVAC system to increase the temperature locally on the back left side, rather than at a location of another passenger that did not request the temperature change. Similarly, other kinds of system interaction may also be better operated with knowledge of the position of the active speaker. For instance, using temporal and power based cues for speaker activity detection may also be relevant for in-car communication (ICC) systems, where the speech may be picked up by dedicated microphones and played back over the loudspeakers close to distant seating positions in the car. To play back only relevant information, it may be beneficial to know which speaker at which seating position is active at a given time instance. ZD process 10 may also be used, e.g., to cancel out noise from other zones, perform active speaker switching, as well as other uses. As will be discussed below, ZD process 10 may help realize an efficient Speaker Activity Detection (SAD) solution for a spatial detection of currently active speakers (spatial microphone zones) in a car based on the fusion of temporal and power based cues, which may be determined, e.g., by the analysis of the signals of distributed and speaker-dedicated microphones.

Hearing aids may use some form of temporal or power based cues for acoustic source localization. However, such hearing aids may be complex, as they generally require knowing the exact location of the speaker, e.g., by requiring knowledge of the exact position of the microphones (e.g., the array geometry or the distance between the two hearing aids). By contrast, ZD process 10 may be simpler and faster, as it may be sufficient for ZD process 10 to know the spatial zone in which the speaker is, nor is it necessarily required for ZD process 10 to know the exact position of the microphones or their detailed arrangement. Generally, all that may be desired is to have the microphones include at least some distance between each other and be close to the provided speaker positions. With such a microphone arrangement, there should ideally be a strong direct sound path from the speaker to their seat-dedicated microphone(s) and a weak sound path for the crosstalk to the distant microphone(s) (e.g., due to the larger distance). Additionally, there may be some background noise, e.g., the driving noise in a car may be large and may even mask the crosstalk components in the distant microphones.

In some implementations, the power cue based confidence may be based upon, at least in part, a signal-to-noise ratio. For example, if the speaker strictly stays in his spatial microphone zone, the power based cues, e.g., ZD process 10 may measure and use the signal-to-noise ratio (SNR) or the speech signal power directly to clearly indicate the location of the speaker. That is, the microphone with the highest SNR or highest speech signal power may indicate the spatial microphone zone of interest to receive the appropriate speaker's speech signal. If the speaker has moved from his nominal position and is near the edge of his spatial microphone zone, the power based cue may no longer be reliable due to, e.g., room acoustics, the radial characteristics of human head movement, the noise variations, and other reasons, may indicate that the SNR or speech signal power is higher in a particular spatial microphone zone, even though it is not the spatial microphone zone associated with the appropriate speaker. The temporal based cue, however, may be used by ZD process 10 to measure the distance of the speaker to the microphones (e.g., if the SNR or speech signal power in the respective microphone signals is not too low). This measure may work much more reliably if the speaker is close to the edge of his spatial microphone zone.

Thus, in some implementations, if ZD process 10 measures a clear difference in SNR or speech power (e.g., the speaker is close to his nominal position, the crosstalk components are low or even masked by background noise), then the SNR or speech power difference may be sufficient for ZD process 10 to identify the appropriate spatial microphone zone for the speaker. In this example scenario, the temporal based cue may not be available, as the SNR or speech signal power in the distant microphone may be too low for computing the temporal based cue.

In some implementations, if ZD process 10 measures a similar (high) SNR or speech power in several microphones from various spatial microphone zones (e.g., the speaker is close to the edge of this spatial microphone zone), the SNR or speech power difference may not be sufficient. In this example scenario, the temporal based cue may be an effective measure (even if the speaker is close to the edge between two spatial microphone zones).

In some implementations, ZD process 10 may identify the temporal feature efficiently in the frequency domain, as most of the algorithms may run in the frequency (or sub-band domain). Generally, the temporal based cue may essentially determine pairwise whether the speech signal arrives first at one microphone or the other microphones. Therefore, the temporal offset between the microphones may be analyzed by ZD process 10. A temporal offset in the time domain $(x2(t)=x1(t-\Delta t))$ may correspond to a linear phase shift in the frequency domain $(X2(f)=X1(f)\cdot\exp\{-2j\pi f\Delta t\})$. As such, ZD process 10 may test whether the relative phase between the two microphone signals tend to increase or decrease over frequency. This corresponds to a positive or a negative value of $\Delta t$ and indicates which microphone is closest to the speaker and which spatial microphone zone is relevant for the appropriate speaker.

In some implementations, the following example process of ZD process 10 may be processed in the discrete Fourier transform domain where the frame index is indicated by l and the frequency sub-band index by k. The signals of the available M microphones in the time domain may be segmented by a Hann window with a frame length K. The indices m, m'∈M={1, . . . , M} denote the particular microphones.

In some implementations, ZD process 10 may determine 302 a temporal cue based confidence for at least a portion of the plurality of microphone zones. For instance, the signals occurring in the sensors (e.g., beamformer) of a pair of microphones m and m' may be temporally shifted. This time shift may be considered as a constant delay in case of a non-moving source. This delay may be characterized by a linear phase of the cross power spectral density (CPSD) estimate $\hat{\Phi}_{m,m'}(l,k)$ at time frame l. This phase relation may be evaluated by ZD process 10 based on the phase difference between adjacent frequency sub-bands k and k−1.

The smoothed CPSD estimates $\hat{\Phi}_{YY,m,m'}(l,k)$ occurring for all available microphone pairs may be computed with the smoothing constant α by, e.g., $$\hat{\Phi}_{YY,m,m'}(l,k) = \alpha \cdot \hat{\Phi}_{YY,m,m'}(l-1,k) + (1-\alpha) \cdot Y^*_m(l,k) \cdot Y_{m'}(l,k), \quad (1)$$

where $Y_m(l,k)$ and $Y_{m'}(l,k)$ are the related microphone signal spectra in the sub-band domain and $(\cdot)^*$ indicates the operator of the complex conjugation.

In some implementations, and for potential efficiency reasons, the following steps need not be processed for all available microphones (in all spatial microphone zones), thereby saving resources and time. As such, ZD process 10 may select a subset of microphones/zones to be included in the ultimate determination process. The temporal cue feature and therewith the occurring delay between two microphones may provide more reliable results for higher power in the microphone signals. The reliability may suffer by, e.g., existing background noise masking the interesting signal components. Thus, the $M_{max}$ microphones, e.g., showing the highest signal power in relation to all M available microphones/sensors, may be selected, e.g., based on the comparison of the signal power occurring in each microphone m. The instantaneous auto power spectral density $\hat{\Phi}_{YY,m}(l,k)$ in one microphone may be, e.g., $$\hat{\Phi}_{YY,m}(l,k) = |Y_m(l,k)|^2. \quad (2)$$

To get a full band value, it may be summed up across all sub-bands k by, e.g., $$\hat{\Phi}_{YY,m}(l) = \sum_{k=0}^{K/2} \hat{\Phi}_{YY,m}(l,k). \quad (3)$$

Based on this equation, the $M_{max}$ microphone indices $\{m_{max}^1, m_{max}^2, \ldots, m_{max}^{M_{max}}\}$ showing the highest signal power may be selected. In the following example, ZD process 10 may want to use the known indices with $m,m' \in M_{max} = \{m_{max}^1, m_{max}^2, \ldots, m_{max}^{M_{max}}\}$ Related to the selected microphones, there may exist, e.g., $$N = \binom{M_{max}}{2} = \frac{M_{max}!}{2! \cdot (M_{max}-2)!} \quad (4)$$

microphone pairs where the phase relation may be evaluated.

For example, in the example scenario of M=6 microphones (e.g., one for each of two seats in three rows) in a van and a speaking driver with his head turned to the right, $M_{max}=3$ microphones may to be selected by ZD process 10 for evaluation. Due to the driver being close to his dedicated microphone and speaking towards the front passenger microphone, $m^1_{max}=1$ and $m^2_{max}=2$ may be indicated as the first two microphones showing a high power. The microphone in the middle row behind the front passenger may be selected as the third microphone/sensor to be considered, e.g., $m^3_{max}=3$. Based on these microphones $$N = \binom{3}{2} = 3$$

microphone pairs may be evaluated in this example, rather than evaluation all 6 microphones.

In some implementations, the temporal cue based confidence may be based upon, at least in part, evaluation of a sign of an imaginary part of a delta phase in different frequency sub-bands in a sub-band domain. For example, should there be an assumption an equal signal reaching the first microphone and with some delay the second microphone of a pair of microphones, ZD process 10 may observe a linear phase of the CPSD (i.e., the phase would be a linear function of the frequency). In the considered microphone setup with distributed microphones and only similar spectra occurring in the different sensors originating from one source, the phase relation may be unsteady; however, for deciding at which sensor the signal comes first, ZD process 10 may decide if the phase difference shows a positive or negative slope. This phase relation may be evaluated based on the phase between adjacent frequency sub-bands k and k−1. For this, ZD process 10 may multiply the above computed power spectral densities for two neighboring sub-bands and obtain some delta CPSD $$\widetilde{\Delta CPSD}_{m,m'}(l,k) = \hat{\Phi}_{YY,m,m'}(l,k) \cdot \hat{\Phi}^*_{YY,m,m'}(l,k-1) \quad (5)$$

$$= A_{m,m'}(l,k) \cdot e^{j\Delta\varphi_{m,m'}(l,k)} \quad (6)$$

$$= A_{m,m'}(l,k) \cdot (\cos(\Delta\varphi_{m,m'}(l,k)) + \quad (7)$$

$$j(\sin(\Delta\varphi_{m,m'}(l,k))).$$

In the phase information, the scaling factor $A_{m,m'}(l,k)$ may be ignored in this view. The delta phase $\Delta\varphi_{m,m'}(l,k)$ may be determined based on Equation (6) by applying the angle operator, e.g., ∠:

$$\Delta\varphi_{m,m'}(l,k) = \angle \widetilde{\Delta CPSD}_{m,m'}(l,k). \quad (8)$$

To decide if a positive or negative slope is available, it may be sufficient and efficient to consider the sign of the imaginary part of $\widetilde{\Delta CPSD}_{m,m'}(l,k)$ only. Therefore, Equation (5) may be expanded. For the resulting imaginary part of the delta CPSD determined by $\psi_{m,m'}(l,k)$ follows, e.g.:

$$\psi_{m,m'}(l,k) = \text{Im}\{\widetilde{\Delta CPSD}_{m,m'}(l,k)\} \quad (9)$$

$$= \text{Re}\{\hat{\Phi}_{YY,m,m'}(l,k-1)\} \cdot \text{Im}\{\hat{\Phi}_{YY,m,m'}(l,k)\} \ldots -$$

$$\text{Re}\{\hat{\Phi}_{YY,m,m'}(l,k)\} \cdot \text{Im}\{\hat{\Phi}_{YY,m,m'}(l,k-1)\}.$$

For each frame l and frequency bin k a binary mask $\Psi^+_{m,m'}(l,k)$ may be determined that indicates if the imaginary part of the delta CPSD shows positive values, e.g.:

$$\Psi^+_{m,m'}(l,k) = \begin{cases} 1, & \text{if } \psi_{m,m'}(l,k) > 0, \\ 0, & \text{else.} \end{cases} \quad (10)$$

Similarly, negative values of $\psi_{m,m'}(l,k)$ across frequency may be indicated by the binary mask, e.g., $\Psi^-_{m,m'}(l,k)$:

$$\Psi^-_{m,m'}(l,k) = \begin{cases} 1, & \text{if } \psi_{m,m'}(l,k) < 0, \\ 0, & \text{else.} \end{cases} \quad (11)$$

However, the evaluation of the delta phase occurring in each sub-band may only provide reliable information if there is sufficient power above the background noise available. Thus, evaluating Equation (9) may be only reliable if, e.g., the SNR exceeds some threshold for the sub-band k and for the sub-band k−1, occurring in the microphones m and m'. The signal-to-noise ratio $\widehat{SNR}_m(l,k)$ may be estimated by, e.g.:

$$\widehat{SNR}_m(l,k) = \frac{\hat{\Phi}_{YY,m}(l,k) - \hat{\Phi}_{NN,m}(l,k)}{\hat{\Phi}_{NN,m}(l,k)}, \quad (12)$$

whereas $\hat{\Phi}_{NN,m}(l,k)$ is the estimated noise power spectral density in the $m^{th}$ microphone signal. By comparing this SNR with a threshold v, a binary measure $B_m(l,k)$ may be determined by ZD process 10 that indicates if the imaginary part of the delta cross power spectral density should be evaluated, e.g.:

$$B_m(l,k) = \quad (13)$$
$$\begin{cases} 1, & \text{if } (SNR_m(l,k) > v) \land (SNR_{m'}(l,k) > v) \land (SNR_m(l,k-1) > v) \land \\ & (SNR_{m'}(l,k-1) > v), \\ 0, & \text{else.} \end{cases}$$

If Equation (13) signifies sufficient power above background noise, full band scores may be determined by ZD process 10 out of the binary masks in Equation (10) and Equation (11). For both, it may be counted how often positive or negative values, respectively, occur in the currently considered frame. The score $c^+_{m,m'}(l)$ indicates the number of positive values of the imaginary part of the considered delta CPSD by evaluation of the binary mask, e.g., $\Psi^+_{m,m'}(l,k)$:

$$c^+_{m,m'}(l) = \sum_{k=0}^{K/2} (\Psi^+_{m,m'}(l,k) \cdot B_m(l,k)). \quad (14)$$

For the score $c^-_{m,m'}(l)$ related to negative values of $\psi_{m,m'}(l,k)$ may follow equivalently, e.g.:

$$c^-_{m,m'}(l) = \sum_{k=0}^{K/2} (\Psi^-_{m,m'}(l,k) \cdot B_m(l,k)). \quad (15)$$

For each microphone pair, information exists to indicate which microphone is reached first by the sound originating from a source near one particular microphone. This information may be dependent on the index order of the microphone pair generation. For example, if the delta phase is evaluated between the microphones m and m' ZD process 10 may often obtain positive values for $\psi_{m,m'}(l,k)$ if the sound source near microphone m is active. If $\psi_{m',m}(l,k)$ is evaluated, ZD process 10 may obtain a negative sign for the same situation. Thus, the microphone order should be considered, as shown in the following example steps. For efficiency reasons, $\psi_{m,m'}(l,k)$ and $\psi_{m',m}(l,k)$ do not both need to be calculated. A mapping may be done by flipping the sign, e.g.:

$$\psi_{m,m'}(l,k) = -\psi_{m',m}(l,k). \quad (16)$$

For each microphone pair the scores $c^+_{m,m'}(l)$ and $c^-_{m,m'}(l)$ are available, and this information may be combined to detect the one microphone that is close to the active zone (i.e., the spatial microphone zone for the appropriate speaker). For the detection of an active source in zone m, it may be expected that the positive score $c^+_{m,m'}(l)$ exceeds the negative one for all N−1 available microphone pairs. If this is true for the pair of microphones, m and m' may be indicated by the measure, e.g., $D_{m,m'}(l)$:

$$D_{m,m'}(l) = \begin{cases} 1, & \text{if } c^+_{m,m'}(l) > c^-_{m,m'}(l), \\ 0, & \text{else.} \end{cases} \quad (17)$$

Evaluating this measure across all microphone pairs may provide a score $R_m(l)$ for a particular microphone m, e.g.:

$$R_m(l) = \sum_{\substack{m' \in M_{max} \\ m' \neq m}} D_{m,m'}(l). \quad (18)$$

Based on this measure, a full band temporal cue based speaker activity detection $SAD_m^T(l)$ may be determined, e.g.:

$$SAD_m^T(l) = \begin{cases} 1, & \text{if } R_m(l) = N - 1, \\ 0, & \text{else.} \end{cases} \quad (19)$$

To characterize how reliable the evaluation of the delay and therewith the temporal cue based speaker activity detection is, a confidence $C_m^T(l)$ may be calculated based on the previously computed scores. For example, this confidence may be realized as follows:

$$C_m^T(l) = \sum_{\substack{m' \in M_{max} \\ m' \neq m}} \beta_T \cdot (c^+_{m,m'}(l) - c^-_{m,m'}(l)), \quad (20)$$

where $\beta_T$ is a pre-defined scaling factor to control the range of the confidence.

In some implementations, ZD process 10 may determine 304 a power cue based confidence for at least a portion of the plurality of microphone zones. For example, the active zone or speaker may also be detected by, e.g., evaluation of signal power ratios (SPR). A signal power ratio may be determined by the ratio between the estimated speech power spectral density $\hat{\Phi}_{RR,m}(l,k)$ occurring in the signal m compared to the maximum signal power that may be found in one of the other input signals with the index m', e.g.:

$$\widehat{SPR}_m(l, k) = \frac{\max\{\hat{\Phi}_{RR,m}(l, k), \epsilon\}}{\max\left\{\max_{\substack{m' \in M \\ m' \neq m}} \{\hat{\Phi}_{RR,m'}(l, k)\}, \epsilon\right\}}. \quad (21)$$

Here, $\epsilon$ is a small value that ensures the regularization of the expression. Similar to the evaluation of the temporal based cues, the SPR should generally only be evaluated if a sufficiently high SNR is available. If the $m^{th}$ source is active, a logarithmic power ratio larger than 0 may be present in the considered sub-band. If a different source close to a distant microphone is active, the logarithmic SPR may be lower than 0. Thus, to determine a full band measure, positive and negative counter scores $c_m^+(l)$ and $c_m^-(l)$ may also be calculated based on the power ratio evaluation, counting the number of sub-bands showing a positive or negative logarithmic power ratio.

Based on these scores, ZD process 10 may determine a measure where a power ratio based full band speaker activity detection $SAD_m^P(l)$ may be derived after thresholding. Furthermore, a power based cue confidence may be computed based on the scores $c_m^+(l)$ and $c_m^-(l)$, e.g., by:

$$C_m^P(l) = \beta_P \cdot (c_m^+(l) - c_m^-(l)), \quad (22)$$

where $\beta_P$ is a pre-defined scaling factor to control the range of the confidence.

In some implementations, ZD process 10 may identify 306 a microphone zone of the plurality of microphone zones from which to use an output signal of the speaker based upon, at least in part, a combination of the temporal cue based confidence and the power cue based confidence. For example, to determine a combination of the power ratio based speaker activity detection $SAD_m^T(l)$ and the new temporal cue based one $SAD_m^T(l)$, the temporal cue confidence $C_m^T(l)$ may indicate if the application of the temporal cue based result is reliable. On the other hand, the reliability of the power based SAD may be evaluated by the confidence $C_m^P(l)$. In some implementations, identifying 306 the microphone zone of the plurality of microphone zones from which the speech signal originated from the speaker may include comparing 308 the temporal cue based confidence and the power cue based confidence, where identifying 306 the microphone zone of the plurality of microphone zones from which the speech signal originated from the speaker may further include selecting 310 the temporal cue based confidence to identify the microphone zone when the temporal cue based confidence is higher than the power cue based confidence, and where identifying 306 the microphone zone of the plurality of microphone zones from which the speech signal originated from the speaker may further include selecting 312 the power cue based confidence to identify the microphone zone when the power cue based confidence is higher than the temporal cue based confidence. This may be done independently by comparison with particular thresholds and/or both confidences can be compared to each other. For example, the higher confidence may win and the related SAD detector may selected.

Figure 5:
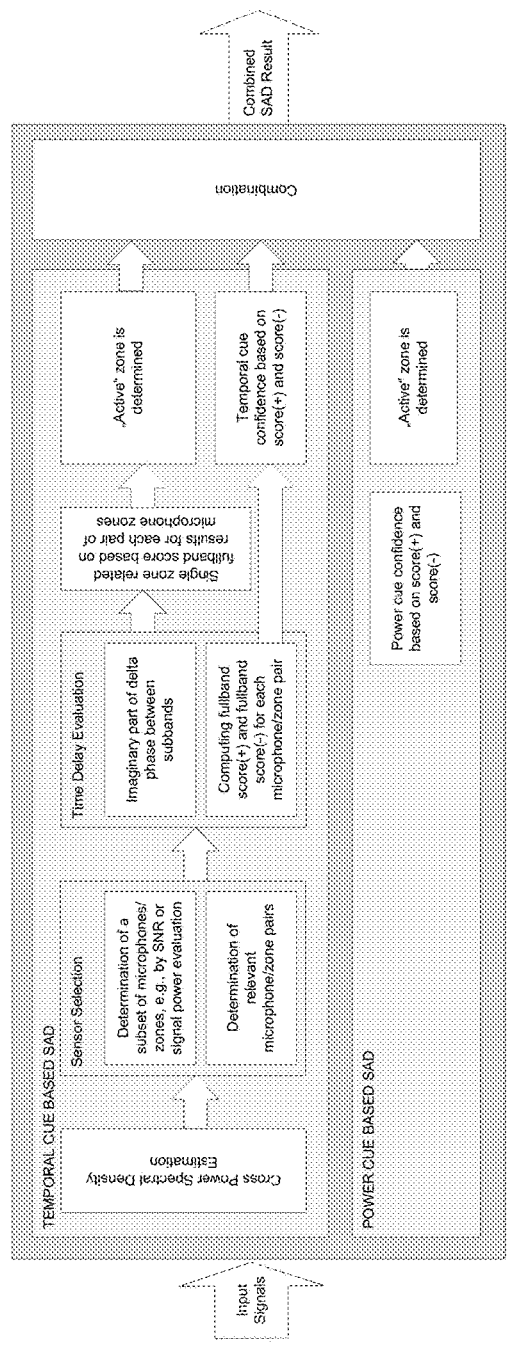
FIG. 5 is an example flowchart of a zone detection process according to one or more example implementations of the disclosure.
Figure 6:
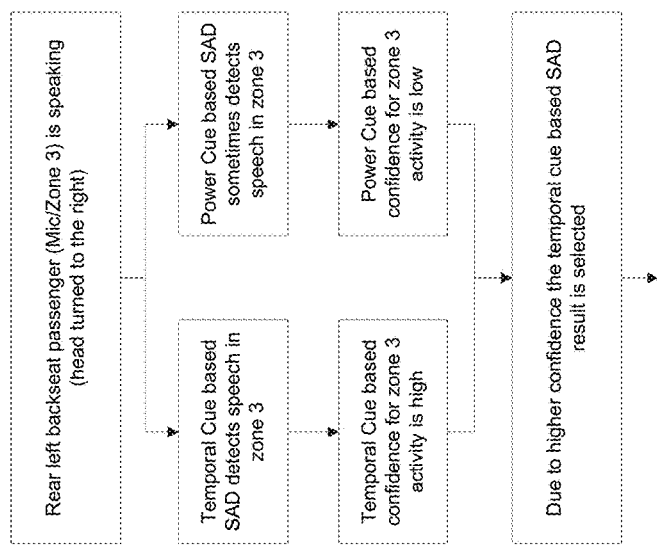
FIG. 6 is an example flowchart of a zone detection process according to one or more example implementations of the disclosure.

For instance, and referring at least to the example flowchart 500 of FIG. 5 and example flowchart 600 of FIG. 6, assume for example purposes only that a temporal cue based SAD indicates that zone 3 detects speech, but that the power cue based SAD also indicates that zone 3 detects speech. In the example, if the temporal cue based confidence is higher than the power cue based confidence, then the temporal cue based confidence will "win" (e.g., be selected as the best indicator), thus identifying zone 3 as the microphone zone from which to use the resulting output signal. Conversely, if the temporal cue based confidence is lower than the power cue based confidence, then the power cue based confidence will "win" (e.g., be selected as the best indicator), thus identifying zone 3 as the microphone zone from which to use the resulting output signal. Thus, depending on those confidences, either the power cue based or the temporal cue based SAD may be selected in order to get a final result for the detection of the currently active zone, thereby identifying the microphone zone from which to use the resulting output signal.

As a further explanation of a possible implementation, each microphone zone may have a temporal and a power cue based confidence and for each microphone zone m these confidences may be compared to find the highest confidence and therewith the best indicator for this microphone zone m. However, in some implementations, this confidence comparison may not directly imply that the microphone zone showing the highest confidence is selected. The confidence may be evaluated in relation to the actual detectors in Eq. (23). Thus, if no detector indicates microphone zone activity then no activity is detected, although a high confidence may occur. According to the equations, ZD process 10 may have M binary detectors, showing a 0 or 1 each. Thus, usually only one of those detectors may indicate activity of the dedicated zone by a 1, all the others may be 0. In some implementations, it may happen in extreme cases that more than one detector indicates speaker activity (e.g., 1 for m=1 and 1 for m=3). This may happen in reality and may be caused by the power cue based detector in Eq. (23) if more than one speaker is active at the same time. How to resolve such ambiguities may vary based upon the application or further algorithmic parts (e.g., compare the confidence scores across the M channels and select one channel; e.g., with multiple detected zones multi-talk periods may be detected and further steps may be processed differently compared to only a single detected zone). Thus, in some implementations, only activity in the particular $m^{th}$ zone may be detected, and if this is the only positive detection result, then its signal may be the one from which to use as the output.

For instance, the following example rule for the determination of the final power-temporal-cue based detection result $SAD_m^T(l)$ may be possible, e.g.:

$$SAD_m^{P/T}(l) = \begin{cases} SAD_m^T(l), & \text{if } (C_m^P(l) < \gamma) \wedge (C_m^T(l) > \kappa), \\ SAD_m^P(l), & \text{else}, \end{cases} \quad (23)$$

where $\gamma$ is a parameter controlling the impact of the temporal based cue feature compared to the power based cue feature, and $\kappa$ is the sensitivity of using the temporal cue based result.

With this combination of power and temporal cue based features, a robust result may be achieved even if a speaker slightly moves or turns his/her head. Power and temporal cue based SAD may complement each other. The power based SAD may show good results if the separation between the dedicated microphone and the distant ones is large. In these situations, the temporal cue based SAD may suffer (e.g., during high background noise) but may still outperform the power based SAD if the speaker leaves his rest position in some way.

In some implementations, the temporal cue based confidence may be based upon, at least in part, an observed delay being one of greater than and less than a pre-defined delay. For instance, the evaluation of temporal cues and therewith the delay occurring between two microphones need not be limited to the determination of whether a positive or negative delay exists. For example, ZD process 10 may also determine if the observed delay is greater than or less than a given pre-defined delay τ. This may be done by modification of the reference so that this reference is not at a time delay of zero but at a delay of τ. Including an additional complex factor in Equation (6) it follows, e.g.:

$$\Delta\widehat{CPSD}_{m,n}(l,k)=A_{m,n}(l,k)\cdot e^{j\Delta\varphi_{m,n}(l,k)}\cdot e^{-j2\pi/K\cdot k\cdot \tau}. \quad (24)$$

If τ=0 is selected, the additional factor may be neutralized and the same reference as before may be considered.

In some implementations, the identifying of the appropriate spatial microphone zone need not be limited to the evaluation of acoustic cues. For example, visual information may be provided by a camera that may or may not support the above-noted acoustic detection features. In the example, such a camera may be constructed to know which seats are taken by speakers in the car. If only one person is sitting in the car detected by visual information, there may be no need for further acoustic speaker detection algorithms. Additionally, if, e.g., two speakers are sitting in the car, only those two spatial microphone zones need to be considered in further acoustic signal processing steps, and the number of used microphones may be reduced.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, by a computing device, a speech signal from a speaker via a plurality of microphone zones;
   determining temporal cue based confidence for at least a portion of the plurality of microphone zones;
   determining power cue based confidence for the at least the portion of the plurality of microphone zones, wherein the at least the portion includes at least two zones of the plurality of zones;
   identifying a microphone zone of the plurality of microphone zones from which the speech signal originates from the speaker, based upon, at least in part, a combination of the temporal cue based confidence determined for the at least the portion of the plurality of microphone zones and the power cue based confidence determined for the at least the portion of the plurality of microphone zones; and
   using the speech signal from the identified microphone zone as an output signal in a speech system;
   wherein the identifying includes comparing the temporal cue based confidence and the power cue based confidence, and wherein the identifying further includes selecting the temporal cue based confidence to identify the microphone zone when the temporal cue based confidence is higher than the power cue based confidence.

2. The computer-implemented method of claim 1 wherein the identifying the microphone zone of the plurality of microphone zones from which the speech signal originates from the speaker further includes selecting the power cue based confidence to identify the microphone zone when the power cue based confidence is higher than the temporal cue based confidence.

3. The computer-implemented method of claim 1 wherein the temporal cue based confidence is based upon, at least in part, a signal-to-noise ratio.

4. The computer-implemented method of claim 1 wherein the temporal cue based confidence is based upon, at least in part, evaluation of a sign of an imaginary part of a delta phase in different frequency sub-bands in a sub-band domain.

5. The computer-implemented method of claim 1 wherein the temporal cue based confidence is based upon, at least in part, an observed delay being one of greater than and less than a pre-defined delay.

6. A computer program product residing on a non-transitory computer readable storage medium having a plurality of instructions stored thereon which, when executed across one or more processors, causes at least a portion of the one or more processors to perform operations comprising:
   receiving a speech signal from a speaker via a plurality of microphone zones;
   determining temporal cue based confidence for at least a portion of the plurality of microphone zones;
   determining power cue based confidence for the at least the portion of the plurality of microphone zones, wherein the at least the portion includes at least two zones of the plurality of zones;
   identifying a microphone zone of the plurality of microphone zones from which the speech signal originates from the speaker, based upon, at least in part, a combination of the temporal cue based confidence determined for the at least the portion of the plurality of microphone zones and the power cue based confidence determined for the at least the portion of the plurality of microphone zones; and using the speech signal from the identified microphone zone as an output signal in a speech system;

wherein the identifying includes comparing the temporal cue based confidence and the power cue based confidence, and wherein the identifying further includes selecting the temporal cue based confidence to identify the microphone zone when the temporal cue based confidence is higher than the power cue based confidence.

7. The computer program product of claim 6 wherein the identifying the microphone zone of the plurality of microphone zones from which the speech signal originates from the speaker further includes selecting the power cue based confidence to identify the microphone zone when the power cue based confidence is higher than the temporal cue based confidence.

8. The computer program product of claim 6 wherein the temporal cue based confidence is based upon, at least in part, a signal-to-noise ratio.

9. The computer program product of claim 6 wherein the temporal cue based confidence is based upon, at least in part, evaluation of a sign of an imaginary part of a delta phase in different frequency sub-bands in a sub-band domain.

10. The computer program product of claim 6 wherein the temporal cue based confidence is based upon, at least in part, an observed delay being one of greater than and less than a pre-defined delay.

11. A computing system including one or more processors and one or more memories configured to perform operations comprising:

receiving a speech signal from a speaker via a plurality of microphone zones;

determining temporal cue based confidence for at least a portion of the plurality of microphone zones;

determining power cue based confidence for the at least the portion of the plurality of microphone zones, wherein the at least the portion includes at least two zones of the plurality of zones;

identifying a microphone zone of the plurality of microphone zones from which the speech signal originates from the speaker, based upon, at least in part, a combination of the temporal cue based confidence determined for the at least the portion of the plurality of microphone zones and the power cue based confidence determined for the at least the portion of the plurality of microphone zones; and using the speech signal from the identified microphone zone as an output signal in a speech system;

wherein the identifying includes comparing the temporal cue based confidence and the power cue based confidence, and wherein the identifying further includes selecting the temporal cue based confidence to identify the microphone zone when the temporal cue based confidence is higher than the power cue based confidence.

12. The computing system of claim 11 wherein the identifying the microphone zone of the plurality of microphone zones from which the speech signal originates from the speaker further includes selecting the power cue based confidence to identify the microphone zone when the power cue based confidence is higher than the temporal cue based confidence.

13. The computing system of claim 11 wherein the temporal cue based confidence is based upon, at least in part, a signal-to-noise ratio.

14. The computing system of claim 11 wherein the temporal cue based confidence is based upon, at least in part, evaluation of a sign of an imaginary part of a delta phase in different frequency sub-bands in a sub-band domain.

15. The computing system of claim 11 wherein the temporal cue based confidence is based upon, at least in part, an observed delay being one of greater than and less than a pre-defined delay.

* * * * *